United States Patent [19]

Parkhomenko et al.

[11] Patent Number: 4,958,256
[45] Date of Patent: Sep. 18, 1990

[54] FLAME-PROOF ELECTRIC DEVICE

[76] Inventors: Alexandr I. Parkhomenko; Vitaly S. Dzjuban; Eduard P. Moskalev, all of Donetsk, U.S.S.R.

[73] Assignee: Vsesojuzny Nauchno-Issledovatelsky Proektno-Konstruktorsky I Tekhnologichesky, Institut Yzryvozaschischennogo I Rudnichnogo Elek Trodborudovaniga, Donetsk, U.S.S.R.

[21] Appl. No.: 412,675

[22] Filed: Sep. 26, 1989

[51] Int. Cl.⁵ .............................................. H02B 1/04
[52] U.S. Cl. .................................. 361/331; 200/302.1; 174/52.1; 361/356
[58] Field of Search ................. 174/50, 50.5, 52.1; 361/331, 334, 335, 356, 357, 380, 392; 439/271, 276; 200/293, 297, 302.1, 306, 50 AA

[56] References Cited

U.S. PATENT DOCUMENTS

| | | | |
|---|---|---|---|
| 3,385,945 | 5/1968 | Tums | 200/302.1 |
| 3,582,535 | 6/1971 | Appleton | 174/52.1 |
| 3,614,539 | 10/1971 | Hallenbeck | 361/331 |
| 3,743,800 | 7/1973 | Appleton | 174/52.1 |
| 3,775,551 | 11/1973 | Prehmus | 361/331 |
| 4,213,018 | 7/1980 | Piston | 361/334 |
| 4,527,029 | 7/1985 | Brockmann | 361/331 |

FOREIGN PATENT DOCUMENTS 1501818 2/1978 United Kingdom .

OTHER PUBLICATIONS

Electrical Equipment for the Mining Industry 4 pages.
EMA-Aparator 6 pages.

Primary Examiner—Gerald P. Tolin
Attorney, Agent, or Firm—Ladas & Parry

[57] ABSTRACT

The flame-proof electric device includes a flame-proof partition separating a flame-proof lead-in chamber for the current conductors and power supply cable and a flame-proof component chamber. The flame-proof partition has mounted thereon an interlocking disconnecting switch, a flame-proof casing and at least one first, at least one second and at least one third lead-through current-conducting terminals. The first lead-through current-conducting terminal is connected with the power supply cable and the interlocking disconnecting switch which is also connected through a serial connection of the third and second lead-through current-conducting terminals with the components of the electric circuitry within the flame-proof component chamber.

7 Claims, 3 Drawing Sheets

FLAME-PROOF ELECTRIC DEVICE

FIELD OF THE INVENTION

The invention relates to the field of switching devices controlling the distribution of electric power, and more particularly it relates to flame-proof and explosion-proof electric devices.

The invention can be employed in chemical plants and coal mines characterized by the presence of a flame- or explosion-hazardous environment, and can be incorporated in such flame- or explosion-proof electric devices as flame-proof electromagnetic starters, automatic cutouts, control switchgear.

BACKGROUND OF THE INVENTION

There is known a flame-proof electric device, e.g. a flame-proof electromagnetic starter (cf. "Electrical Equipment for the Mining Industry", a brochure of Wallacetown, GB, pp. 3, 4) wherein the components of the electric circuitry of the device, e.g. contactors, control and protection units are accommodated within a flame-proof component chamber closeable with a lid providing access to the components of the electric circuitry for their maintenance and repairs. The design of the flame-proof electric device includes, in addition to the component chamber, two other flame-proof separate chambers, namely, the lead-in chamber for current conductors, intended for leading-in the power supply cable, and a chamber adapted to accommodate an interlocking disconnecting switch. The actuating or tripping mechanism of the interlocking actuating switch is mechanically connected with the lid of the component chamber in a way permitting the opening of the lid only with the disconnecting switch in the "off" state, i.e. With no voltage supplied to the functional components of the flame-proof electric device. The current-conducting cores of the power supply cable are electrically connected with the input terminals of the interlocking disconnecting switch via lead-through current-conducting terminals mounted on the flame-proof partition between the lead-in chamber and the chamber of the interlocking disconnecting switch. The output terminals of the interlocking disconnecting switch are electrically connected with the components of the electric circuitry of the flame-proof electric device via lead-through current-conducting terminals mounted on the flame-proof partition between the flame-proof chamber of the interlocking disconnecting switch and the flame-proof component chamber. The functional components of the electric circuitry of the flame-proof electric device are electrically connected with the current-conducting cores of a cable connecting the device with the power-receiving apparatus via a flame-proof electric connector accommodated in the flame-proof component chamber.

The flame-proof chamber of the interlocking disconnecting switch is closed with a lid providing access from the outside into this chamber for mounting the disconnecting switch, as well as for its inspection and maintenance.

The device of the prior art is of a complicated design, relatively big dimensions and weight, and its manufacture is complicated. This is explained by the necessity of providing a flame-proof partition with the lead-through current-conducting terminals between the flame-proof chamber of the disconnecting switch and the flame-proof component chamber, and by the successive arrangement of the flame-proof lead-in chamber, the flame-proof chamber of the interlocking disconnecting switch and the flame-proof component chamber, which necessitates the provision of lead-through current-conducting terminals on the respective spaced flame-proof partitions.

There is further known a flame- and explosion-proof electric device (GB, A, 1501818), comprising a flame-proof lead-in chamber intended for leading in the power supply cable, a flame-proof component chamber accommodating therein the functional components of the electric circuitry of the flame-proof electric device, the lid of the flame-proof component chamber, a flame-proof partition separating the flame-proof lead-in and component chambers, an interlocking disconnecting switch, a flame-proof chamber accommodating the interlocking disconnecting switch with at least one input terminal and at least one output terminal, at least one first lead-through current-conducting terminal mounted on the flame-proof partition and intended for electric connection of the current-conducting core of the power supply cable with the input terminal of the interlocking disconnecting switch, at least one second lead-through current-conducting terminal electrically connected with the output terminal of the interlocking disconnecting switch and the components of the electric circuitry, accommodated in the flame-proof component chamber, an actuating mechanism mechanically connected with the interlocking disconnecting switch and the lid of the flame-proof component chamber. The at least one second lead-through current-conducting terminal is accommodated on the lid of the chamber of the interlocking disconnecting switch, serving as the flame-proof partition between the flame-proof chamber of the interlocking disconnecting switch and the flame-proof component chamber.

The design of the last-described flame-proof electric device is also relatively complicated and involves difficulties in its manufacture, as it includes two spaced flame-proof partitions with lead-through current-conducting terminals. Moreover, the maintenance of the interlocking disconnecting switch is relatively difficult on account of the switch being accessible only upon the opening of the lid of the flame-proof lead-in chamber, disconnection of the cores of the power-supply cable and of the conductors in the flame-proof component chamber from the lead-through current-conducting terminals, and removal of the disconnecting switch from its chamber.

SUMMARY OF THE INVENTION

It is an object of the present invention to simplify the structure of a flame-proof electric device.

It is another object of the present invention to facilitate the manufacture of this device.

The essence of the present invention resides in a flame-proof electric device comprising a flame-proof lead-in chamber for leading-in current conductors and the power supply cable, a flame-proof component chamber adapted to accommodate therein the components of the electric circuitry of the electric flame-proof device, the lid of the flame-proof component chamber, a flame-proof partition separating the flame-proof lead-in chamber and component chamber, an interlocking disconnecting switch having at least one input terminal and at least one output terminal, mounted on the flame-proof partition, at least one first lead-through current-conducting terminal mounted on the flame-through partition for electric connection of the current-conducting core of the current conductor of the power supply cable with the input terminal of the interlocking disconnecting switch, at least one second lead-through current-conducting terminal electrically connected with the output terminal of the interlocking disconnecting switch and with the components of the electric circuitry of the flame-proof electric device, accommodated in the flame-proof component chamber, an actuating mechanism mechanically connected with the interlocking disconnecting switch and the lid of the flame-proof component chamber, which device, in accordance with the invention, further comprises at least one third lead-through current-conducting terminal mounted jointly with the second lead-through current-conducting terminal on the flame-proof partition, the electric connection of the output terminal of the interlocking disconnecting switch with the components of the electric circuitry within the flame-proof component chamber being effected through the serially-connected third and second lead-through current-conducting terminals, and also comprises a flame-proof casing mounted on the flame-proof partition and defining with the first and second lead-through current-conducting terminals and the flame-proof partition a flame-proof compartment accommodating therein the interlocking disconnecting switch.

It is expedient that the interlocking disconnecting switch should be mounted on the flame-proof partition with the aid of at least one lead-through current-conducting terminal selected from the group including the at least one first lead-through current-conducting terminal and the at least one third lead-through current-conducting terminal.

It is reasonable that the first, second and third lead-through current-conducting terminals, the interlocking disconnecting switch and the flame-proof partition should form an integrated independent assembly.

It is desirable that the flame-proof partition should be made of an electrically insulating material, integrally with the insulating components of the first, second and third lead-through current-conducting terminals.

The invention provides for mounting all the lead-through current-conducting terminals interconnecting the lead-in chamber and the component chamber and also the interlocking disconnecting switch on one and the same flame-proof partition between the flame-proof lead-in chamber and the flame-proof component chamber.

According to the preferred embodiment of the invention, the structure of the device can be further simplified by mounting the interlocking disconnecting switch on the flame-proof partition with the aid of at least one lead-through current-conducting terminal and integrating the parts of the disconnecting switch with the parts of this lead-through current-conducting terminal, which reduces the number of the component parts of the device and facilitates its assembly.

To do away with the necessity of assembling the lead-through current-conducting terminals and the interlocking disconnecting switch in the disclosed flame-proof electric device, the lead-through current-conducting terminals, the interlocking disconnecting switch and the flame-proof partition are preferably pre-manufactured as an integral independent assembly. Furthermore, the flame-proof partition is preferably made of an electrically insulating material and integrated with the insulating parts of the lead-through current-conducting terminals.

Thus, the present invention simplifies the structure of the flame-proof electric device and facilitates its manufacture.

BRIEF DESCRIPTION OF THE DRAWINGS

The invention will be further described in connection with its embodiments, with reference being made to the accompanying drawings, wherein.

DESCRIPTION OF THE EMBODIMENTS

Figure 1:
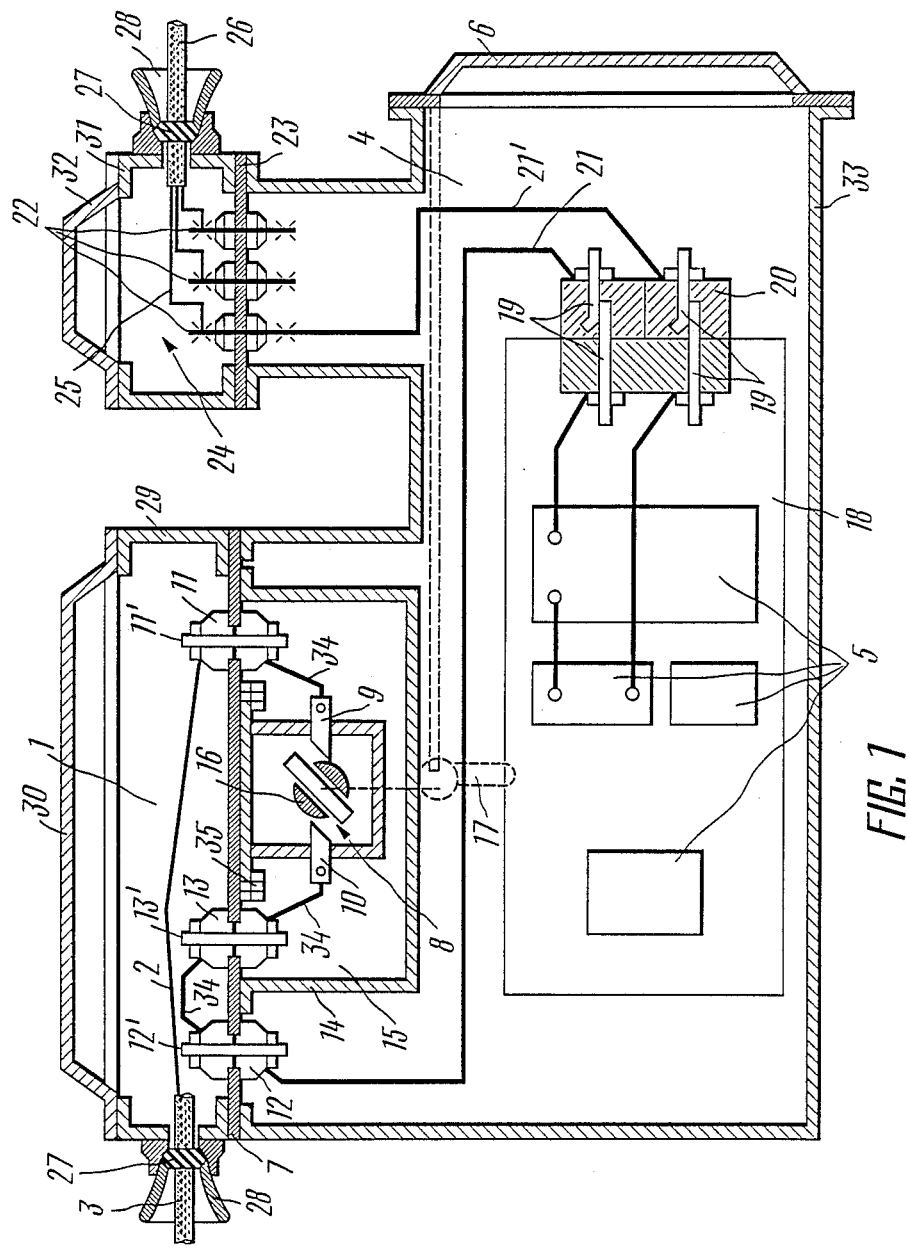
FIG. 1 is a general schematic sectional view of a flame-proof electric device embodying the invention.

The flame-proof electric device embodying the invention comprises a flame-proof lead-in chamber 1 (FIG. 1) for leading conductors 2 from the conducting core or cores of the power-supply cable 3, a flame-proof component chamber 4 for accommodating the functional components 5 of the electric circuitry of the flame-proof electric device, the lid 6 of the flame-proof component chamber 4, a flame-proof partition 7 between the flame-proof lead-in chamber 1 and component chamber 4, an interlocking disconnecting switch (isolator) 8 with at least one input terminal 9 and at least one output terminal 10, mounted on the flame-proof partition 7, at least one first lead-through current-conducting terminal 11 with the conducting part 11', mounted on the flame-proof partition 7 and intended for electrically connecting the conductor 2 coming from the conducting core of the power supply cable 3 to the input terminal 9 of the interlocking disconnecting switch 8, at least one second lead-through current-conducting terminal 12 with the conducting part 12' and at least one third lead-through current-conducting terminal 13 with the conducting part 13', jointly mounted on the flame-proof partition 7 supporting the interlocking disconnecting switch 8. The output terminal 10 of the interlocking disconnecting switch 8 is connected with the components 5 of the electric circuitry of the flame-proof electric device via the serial connection of the third and second lead-through current-conducting terminals 13 and 12.

The flame-proof partition 7 has mounted thereon a flame-proof casing 14 defining jointly with the lead-through current-conducting terminals 11, 13 and the flame-proof partition 7 a flame-proof compartment 15 accommodating therein the interlocking disconnecting switch 8.

The shaft 16 of the interlocking disconnecting switch 8 is operatively connected with a handle 17 mounted outside the flame-proof electric device and operatively connected with the lid 6. In the presently described embodiment the handle 17 and its operative connections with the shaft 16 of the interlocking disconnecting switch 8 and the lid 6 define the mechanical actuating (tripping) mechanism of the device.

The functional components 5 of the electric circuitry of the device are mounted on a board 18 accommodated in the flame-proof component chamber 4. The components 5 of the electric circuitry are connected via the contacts 18 of a connector 20 and a conductor 21 (a connecting wire) with the second lead-through current-conducting terminal 12, while another conductor 21' connects them to a lead-through current-conducting terminal 22 mounted on a flame-proof partition 23 separating the flame-proof component chamber 4 from a flame-proof lead-out chamber 24 where the lead-through terminal 22 is electrically connected with the conducting core 25 of a cable 26 supplying power to the receiving apparatus (not shown) from the components 5 of the electric circuitry of the herein disclosed flame-proof electric device.

The lead-in/lead-out end portions of the respective cables 3 and 26 are sealed by means of sealing rings 27 and thrust cable sleeves 28.

In the embodiment being described, the lead-in flame-proof chamber 1 is defined by a wall 29 and a lid 30. The flame-proof lead-out chamber 24 is defined by a wall 31 and a lid 32. The flame-proof component chamber 4 is defined by a wall 33 and a lid 6.

The lead-through current-conducting terminals 11, 12, 13 are electrically connected to the terminals 9, 10 of the interlocking disconnecting switch 8 via respective conductors (connecting wires) 34.

Schematically illustrated in FIG. 1 of the appended drawings is a single-phase flame-proof electric device embodying the invention. A multi-phase flame-proof electric device constructed in accordance with the invention would include as many electric paths with their respective current-conducting lead-through terminals 11, 12 and 13, and the terminals 9 and 10 of the interlocking disconnecting switch (isolator) 8, as there are phases (poles) in the apparatus this device is associated with.

In the embodiment being described, the interlocking disconnecting switch 8 is secured with the air of threaded pins 35.

In a modified embodiment, the interlocking disconnecting switch 8 (FIG. 2) is mounted on the flame-proof partition 7 with the aid of the at least one first lead-through current-conducting terminal 11 and secured with threaded fasteners 36. In this embodiment, the current-conducting part 11' in the form of a threaded pin receiving the fasteners 36 is connected via a conductor 34 with the input terminal 9 of the disconnecting switch 8. The stationary contacts 37, 38 of the disconnecting switch 8 are connected with the input terminal 9 and output terminal 10, respectively. The output terminal 10 is connected via a conductor 39, a threaded pin 40 with fasteners 41, 42 and a conductor (connecting wire) 34 with the current-conducting part 13' of the third lead-through current-conducting terminal 13. In this embodiment, the insulating parts of the interlocking disconnecting switch 8 and of the at least one lead-through current-conducting terminal 11 are made integral.

In another embodiment of the present invention, the lead-through current-conducting terminals 11 (FIG. 3), 12 and 13, the interlocking disconnecting switch 8 and the flame-proof partition 7 are integrated in an independent assembly, the flame-proof partition 7 being made of an electrically insulating material integrally with the insulating parts of the lead-through current-conducting terminals 11, 12, 13.

The movable contacts 43 are mounted on the shaft 16 of the interlocking disconnecting switch 8 and urged by resilient elements 44, 45. The parts 46, 47 made of an electrically insulating material define the housing of the disconnecting switch 8, held together by a threaded pin 48 with fasteners 49, 50.

Figure 3:
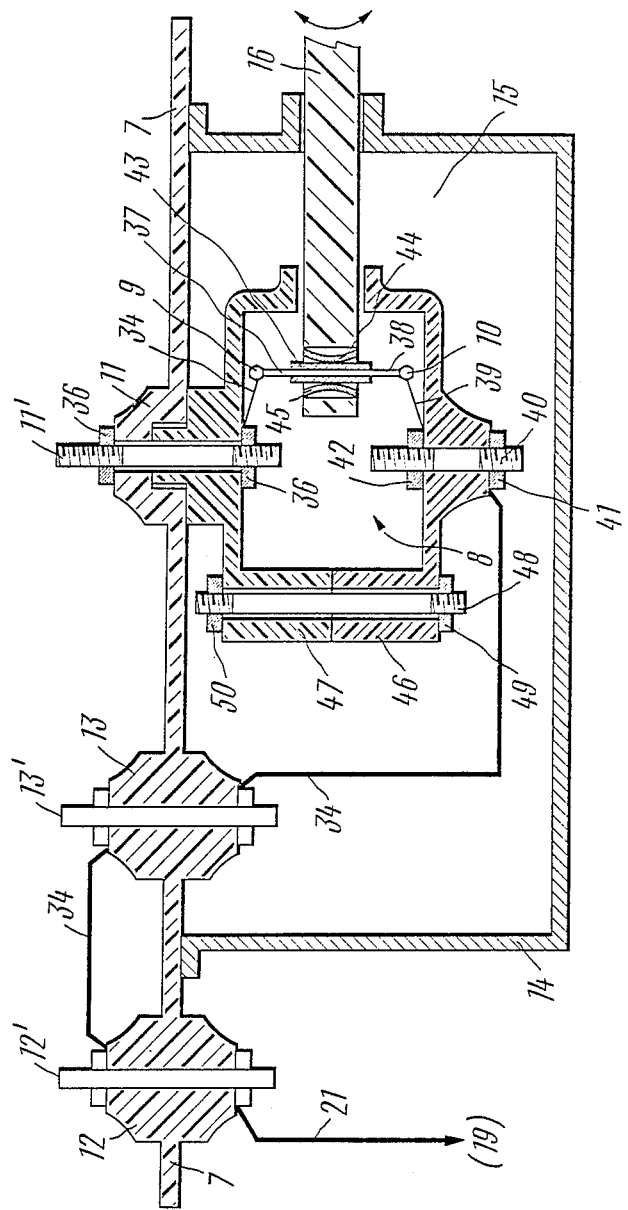
FIG. 3 shows on a larger scale, also in a schematic sectional view, a version of integrating the interlocking disconnecting switch, the lead-through current-conducting terminals and the flame-proof partition in an independent assembly, in accordance with the invention.

Thus, the embodiment illustrated in FIG. 3 presents an integral independent assembly of the interlocking disconnecting switch 8, lead-through current-conducting terminals 11, 12, 13 and flame-proof partition 7. The flame-proof partition 7 and the insulating parts of the lead-through current-conducting terminals 11, 12 and 13 are made of an electrically insulating material.

The disclosed flame-proof (explosion-proof) electric device, e.g. an explosion-proof electromagnetic starter, operates, as follows. With the lid 6 (FIG. 1) closed, the mechanical connection between the lid 16 and handle 17 allows to turn the handle 17, closing the electric circuit in the interlocking disconnecting switch 8 between the input terminal 9 and output terminal 10. Thus, voltage is supplied to the functional components 5 of the electric circuitry of the flame-proof electric device, and they are capable of performing their intended functions of controlling the power-receiving apparatus (e.g. energizing and deenergizing an electric motor—not shown in FIG. 1). With the interlocking disconnecting switch turned off, the handle 17 acquires a position allowing to open the lid 6, thus affording the access to the components 5 of the electric circuitry of the flame-proof electric device being described. In this operating duty no voltage is supplied to the lead-through current-conducting terminals 12, 13 and all the components 5 accommodated inside the flame-proof component chamber 4. Thus, the herein disclosed device performs all its intended functions, while having only one flame-proof partition 7 between the flame-proof lead-in chamber 1 and the flame-proof component chamber 4, having mounted thereon the lead-through current-conducting terminals 11, 12 and 13, and the interlocking disconnecting switch 8. The flame-proof partition 7 has also mounted thereon a flame-proof casing 14 defining with the lead-through current-conducting terminals 11, 13 and this flame-proof partition 7 the flame-proof compartment 15 accommodating therein the interlocking disconnecting switch 8. This provides for simplifying the structure of the disclosed device and facilitating its manufacture.

Figure 2:
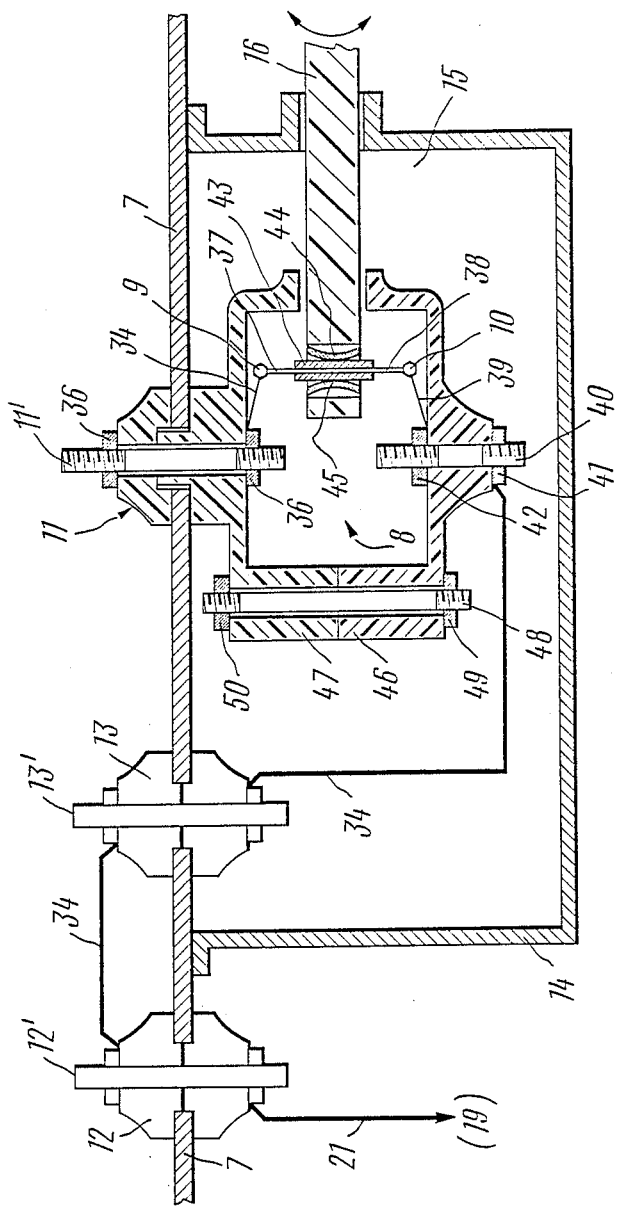
FIG. 2 shows on a larger scale in a schematic sectional view a version of mounting the interlocking disconnecting switch with the aid of a lead-through terminal, in accordance with the invention.

Furthermore, with the interlocking disconnecting switch 8 mounted with the aid of the at least one lead-through current-conducting terminal, e.g. the terminal 11, as shown in FIG. 2, the overall number of the components of the disclosed flame-proof electric device is reduced and its structure is simplified still further, with less assembly operations and easier manufacture of the device.

With the lead-through current-conducting terminals 11, 12, 13, the interlocking disconnecting switch 8, their interconnecting conductors 2, 34 and the flame-proof partition 7 being integrated in a single independent assembly, as shown in FIG. 3, and also with the flame-proof partition 7 and the insulating parts of the lead-through current-conducting terminals 11, 12 and 13 being made integrally of one and the same electrically insulating materil, this assembly can be manufactured separately from the rest of the disclosed device and mounted after the manufacture and assembly of all the other structural components of the disclosed flame-proof electric device, prior to the mounting of the lead-in chamber 1. In this way, the number of assembly operations performed in the confined spaces of the flame-proof chambers 1 and 4 can be reduced still further, facilitating the manufacture of the disclosed flame-proof electric device.

It can be seen from the above disclosure that the invention provides for simplifying the structure of a flame-proof electric device and facilitating its manufacture.

What is claimed is:

1. A flame-proof electric device, comprising:
    a flame-proof lead-in chamber for a power supply cable with a current-conducting core;
    an electric circuitry made up of components of said electric circuitry;
    a flame-proof component chamber accommodating therein said components of said electric circuitry;
    a lid on said flame-proof component chamber;
    a flame-proof partition separating said flame-proof lead-in chamber and said flame-proof component chamber;
    an interlocking disconnecting switch mounted on said flame-proof partition, having at least one input terminal and at least one output terminal;
    at least one first lead-through current-conducting terminal mounted on said flame-proof partition for electric connection of said current-conducting core of said power supply cable with said input terminal of said interlocking disconnecting switch, said first lead-through current conducting terminal including insulating parts;
    at least one second lead-through current-conducting terminal mounted on said flame-proof partition, said at least one second lead-through current-conducting terminal including insulating parts;
    at least one third lead-through current-conducting terminal mounted on said flame-proof partition, said at least one third lead-through current-conducting terminal including insulating parts;
    said output terminal of said interlocking disconnecting switch being connected with said components of said electric circuitry within said flame-proof component chamber via a serial connection of said third and second lead-through current-conducting terminals;
    an actuating mechanism operatively connected with said interlocking disconnecting switch and said lid of said flame-proof component chamber;
    a flame-proof casing secured on said flame-proof partition;
    a flame-proof compartment defined by said flame-proof casing, said first and second lead-through current-conducting terminals and said flame-proof partition;
    said interlocking disconnecting switch being accommodated within said flame-proof compartment.

2. A flame-proof electric device as set forth in claim 1, wherein:
    said interlocking disconnecting switch is mounted on said flame-proof partition with the aid of at least one lead-through current-conducting terminal selected from said first and third lead-through current-conducting terminals.

3. A flame-proof electric device as set forth in claim 1, wherein:
    said first, second and third lead-through current-conducting terminals, said interlocking disconnecting switch and said flame-proof partition form an integrated independent assembly.

4. A flame-proof electric device as set forth in claim 2, wherein:
    said first, second and third lead-through current-conducting terminals, said interlocking disconnecting switch and said flame-proof partition form an integrated independent assembly.

5. A flame-proof electric device as set forth in claim 1, wherein said flame-proof partition is made of an electrically insulating material integrally with said insulating parts of said first, second and third lead-through current-conducting terminals.

6. A flame-proof electric device as set forth in claim 2, wherein said flame-proof partition is made of an electrically insulating material integrally with said insulating parts of said first, second and third lead-through current-conducting terminals.

7. A flame-proof electric device as set forth in claim 3, wherein said flame-proof partition is made of an electrically insulating material integrally with said insulating parts of said first, second and third lead-through current-conducting terminals.

* * * * *